(12) United States Patent
Wang et al.

(10) Patent No.: US 10,429,539 B2
(45) Date of Patent: Oct. 1, 2019

(54) METHOD AND SYSTEM FOR CONTROL AND DATA PROCESSING IN FIELD OPERATION WITH GROUND ELECTROMAGNETIC INSTRUMENT

(71) Applicant: Institute of Geology and Geophysics, Chinese Academy of Sciences, Beijing (CN)

(72) Inventors: Zhongxing Wang, Beijing (CN); Tianxin Zhang, Beijing (CN); Renzhong Pei, Beijing (CN); Yongyou Yang, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/178,310

(22) Filed: Nov. 1, 2018

(65) Prior Publication Data
US 2019/0129058 A1    May 2, 2019

(30) Foreign Application Priority Data
Nov. 2, 2017    (CN) .......................... 2017 1 1062925

(51) Int. Cl.
| G08B 1/08 | (2006.01) |
| G01V 3/38 | (2006.01) |
| G05D 1/02 | (2006.01) |
| G01V 3/36 | (2006.01) |
| G01V 3/17 | (2006.01) |
| G01V 3/08 | (2006.01) |

(52) U.S. Cl.
CPC ................ *G01V 3/38* (2013.01); *G01V 3/08* (2013.01); *G01V 3/17* (2013.01); *G01V 3/36* (2013.01); *G05D 1/0202* (2013.01)

(58) Field of Classification Search
CPC ... G01V 3/38; G01V 3/17; G01V 3/36; G05D 1/0202
USPC ....................................................... 340/539.1
See application file for complete search history.

(56) References Cited

U.S. PATENT DOCUMENTS 3,984,803 A * 10/1976 Hawk .................... G01V 1/001
                                                                367/2
4,885,724 A * 12/1989 Read ..................... G01V 1/223
                                                                367/77

(Continued)

FOREIGN PATENT DOCUMENTS

| CN | 102721976 A | 10/2012 |
| CN | 104122597 A | 10/2014 |

(Continued)

*Primary Examiner* — Zhen Y Wu
(74) *Attorney, Agent, or Firm* — Novick, Kim & Lee, PLLC; Allen Xue

(57) ABSTRACT

A method and a system for control and data processing in field operation with a ground electromagnetic instrument includes an aircraft flies autonomously to carry out patrol-check for the ground electromagnetic instrument. The aircraft is connected to the instrument through a high-speed wireless link to set the working parameters of the instrument, acquire the working state of the instrument, and acquire data from the instrument, etc. Thus, the workload of the operator is reduced and the operating efficiency is improved in the field operation.

10 Claims, 2 Drawing Sheets

(56) References Cited

U.S. PATENT DOCUMENTS

| | | | | |
|---|---|---|---|---|
| 5,920,828 A * | 7/1999 | Norris | | G01V 1/003 |
| | | | | 702/14 |
| 5,969,608 A * | 10/1999 | Sojdehei | | G08B 13/1663 |
| | | | | 340/539.1 |
| 8,325,561 B2 * | 12/2012 | Bull | | G01V 1/22 |
| | | | | 367/59 |
| 9,121,969 B2 * | 9/2015 | Rigsby | | G01V 1/3808 |
| 10,048,702 B1 * | 8/2018 | Florence | | E02D 3/00 |
| 2005/0114033 A1 * | 5/2005 | Ray | | G01V 1/223 |
| | | | | 702/14 |
| 2008/0205191 A1 * | 8/2008 | Coste | | G01V 1/3835 |
| | | | | 367/15 |
| 2009/0135671 A1 * | 5/2009 | Meunier | | G01V 1/005 |
| | | | | 367/56 |
| 2013/0018585 A1 * | 1/2013 | Zhdanov | | G01V 3/083 |
| | | | | 702/2 |
| 2013/0261873 A1 * | 10/2013 | Pal | | E21B 47/042 |
| | | | | 701/28 |
| 2014/0254309 A1 * | 9/2014 | Guo | | G01V 1/22 |
| | | | | 367/14 |
| 2014/0254317 A1 * | 9/2014 | Thompson | | G01V 11/00 |
| | | | | 367/21 |
| 2014/0312905 A1 * | 10/2014 | Wheelock | | G01V 3/165 |
| | | | | 324/331 |
| 2015/0293535 A1 * | 10/2015 | Avery | | G05D 1/0291 |
| | | | | 701/26 |
| 2016/0001860 A1 * | 1/2016 | Mizunaga | | B63G 8/001 |
| | | | | 114/331 |
| 2016/0231449 A1 * | 8/2016 | Miles | | G01V 3/16 |
| 2016/0306066 A1 * | 10/2016 | Izarra | | G01V 3/165 |
| 2016/0341845 A1 * | 11/2016 | Park | | G01V 3/165 |
| 2016/0370478 A1 * | 12/2016 | Ouzounov | | G01V 1/008 |
| 2017/0086230 A1 * | 3/2017 | Azevedo | | H04L 67/12 |
| 2017/0292725 A1 * | 10/2017 | Conley | | G05B 19/048 |
| 2018/0037336 A1 * | 2/2018 | Rammos | | H04B 7/18504 |
| 2018/0081075 A1 * | 3/2018 | Smiarowski | | G01V 3/16 |
| 2018/0221781 A1 * | 8/2018 | Green | | A63H 27/14 |
| 2019/0019416 A1 * | 1/2019 | Perko | | G08G 1/202 |

FOREIGN PATENT DOCUMENTS

| | | |
|---|---|---|
| CN | 104155685 A | 11/2014 |
| CN | 204719244 U | 10/2015 |
| CN | 106908847 A | 6/2017 |
| EP | 2267487 A1 | 12/2010 |

* cited by examiner

METHOD AND SYSTEM FOR CONTROL AND DATA PROCESSING IN FIELD OPERATION WITH GROUND ELECTROMAGNETIC INSTRUMENT

CROSS REFERENCE TO RELATED APPLICATIONS

The present application claims the benefit of the Chinese patent application No. 201711062925.9, filed on Nov. 2, 2017 before the Chinese Patent Office, entitled "Field Operation Control and Data Processing Method and System for Ground Electromagnetic Instrument", the contents of which are incorporated herein by reference in their entirety.

FIELD OF THE INVENTION

The present invention relates to the geological survey field, particularly to a method and a system for control and data processing in field operation with a ground electromagnetic instrument.

BACKGROUND OF THE INVENTION

Ground electromagnetic instruments are a sort of instruments that calculate formation resistivity by measuring surface electrical field and magnetic field signals, and are widely applied in mineral exploration, oil and gas survey, subterranean water, and geothermal heat domains, etc. During field operation with a ground electromagnetic method, usually several measuring lines are arranged at an equal interval (the distance between two adjacent measuring lines is usually hundreds of meters) and several measuring points are arranged on each measuring line at an equal interval (the spacing between adjacent measuring points is usually hundreds of meters), and the instrument carries out measurement at the measuring points sequentially. The operation area of field operation with a ground electromagnetic instrument may be as large as several square kilometers or even tens of square kilometers.

In the field operation, the instrument carries out measurement for a time period at each measuring point, the time span of the measurement varies depending on the measurement method, and the volume of acquired data also varies. For example, with a magnetotelluric/audiomagnetotelluric (MT/AMT) method, data may be acquired at the measuring points for several or even tens of hours and the data volume may be hundreds of megabytes in one operation cycle; with a controlled source audiomagnetotelluric (CSAMT) method, data may be acquired at the measuring points for about 1 hour, and the data volume may be several megabytes in one operation cycle. In view that the instruments work for a long time, the operator usually wants to check the working state of the instruments in the working process of the instruments to ascertain whether the instruments operate normally. Therefore, the operator has to carry out patrol-check for the instruments and make corrections timely if any abnormality is found.

At present, the data storage media used by ground electromagnetic instruments are removable storage devices, such as CF cards and SD cards, etc. At each operation cycle is finished, the data is mainly read with either of the following methods: 1) removing the memory card and connecting it to a computer to read the data, and then reinstalling the memory card into the instrument after data reading; 2) connecting a computer through a data cable to the instrument and then reading the data, wherein, the data cable is usually a high-speed data transmission cable, such as USB cable or Ethernet cable, etc. The drawbacks of using a removable storage device include: the vibration resistance of such a detachable interface is usually inferior to the vibration resistance of fixed interfaces; since the storage device has to be removed and then reconnected, wearing damages to the connecting interface of the storage device may occur easily; in addition, since the terminals of the interfaces may be contaminated by clay, the electrical properties of the terminals of the interface may be compromised, i.e., the service life of the interface may be shortened. The same problem of removal/reconnection of the cable also exists when a transmission cable is used; consequently, loose contact may occur and the service life of the transmission cable may be shortened during long-time use in field operation.

Both methods require local operation, i.e., the operator has to go to the instrument and operate with a computer. Moreover, to check the working state of the instrument, the operator has to go to the instrument from time to time. Namely, the operator has to operate at the instrument in and after the working process of the instrument, resulting in manpower waste and degraded efficiency.

Contents of the Invention

In the embodiments of the present invention, a method and a system for control and data processing in field operation with a ground electromagnetic instrument are provided, wherein, an aircraft flies autonomously to carry out patrol-check for the ground electromagnetic instrument, and the aircraft is connected to the instrument through a high-speed wireless link to set the working parameters of the instrument, acquire the working state of the instrument, and acquire data from the instrument, etc. Thus, the workload of the operator is reduced and the operating efficiency is improved in the field operation.

In a first aspect, the present invention provides a system for control and data processing in field operation with a ground electromagnetic instrument. The system comprises a ground electromagnetic instrument, an aircraft, and a monitoring terminal, wherein, the ground electromagnetic instrument comprises a first wireless communication module and a first processing module; the aircraft comprises a second wireless communication module configured to establish wireless communication with the first wireless communication module, a storage device, a satellite positioning and inertial navigation module, and a second processing module; the monitoring terminal comprises a third wireless communication module configured to establish wireless communication with the second wireless communication module, and a third processing module configured to transmit position coordinate parameters and working configuration parameters of the ground electromagnetic instrument to the second processing module by means of wireless communication; the second processing module stores the position coordinate parameters in the storage device, and controls the aircraft to fly to the location of the ground electromagnetic instrument according to the positioning data from the satellite positioning and inertial navigation module and the position coordinate parameters, the second wireless communication module establishes a first wireless communication link with the first wireless communication module, and the second processing module configures the working configuration parameters to the first processing module through the first wireless communication link, so that the ground electromagnetic instrument accomplishes acquisition of required data according to the working configuration parameters.

Optionally, the aircraft is further configured to fly to the location of the ground electromagnetic instrument according to the position coordinate parameters, establish a second wireless communication link, acquire detection status parameters of the ground electromagnetic instrument, and store the detection status parameters in the storage device, then close the second wireless communication link, in the patrol-check and monitoring process; and the monitoring terminal is configured to establish the first wireless communication link with the aircraft and read the detection status parameters stored in the storage device of the aircraft during the data reading process.

Optionally, the monitoring terminal is further configured to judge whether the ground electromagnetic instrument is in an abnormal state according to the detection status parameters read by the monitoring terminal.

Optionally, if the abnormal state is incurred by incorrect connection of a sensor or connector, the monitoring terminal is further configured to prompt the user to go to the location of the ground electromagnetic instrument to handle the abnormality manually.

Optionally, if the abnormal state is incurred by incorrect parameter configuration, the monitoring terminal is further configured to prompt the user to configure the parameters again, and control the aircraft to carry new working configuration parameters configured by the user again and fly to the location of the ground electromagnetic instrument to issue the new working configuration parameters to the ground electromagnetic instrument.

Optionally, the monitoring terminal further comprises a display device configured to display a control interface, wherein, the display device is electrically connected to the first processing module.

In a second aspect, the present invention provides a method for control and data processing in field operation with a ground electromagnetic instrument. The method comprises:

acquiring position coordinate parameters of a ground electromagnetic instrument;

transmitting the position coordinate parameters and working configuration parameters to an aircraft through a first wireless communication link;

controlling the aircraft to fly to the location of the ground electromagnetic instrument according to the position coordinate parameters in conjunction with satellite positioning and inertial navigation data;

controlling the aircraft to establish a second wireless communication link with the ground electromagnetic instrument; and issuing the working configuration parameters to the ground electromagnetic instrument through the second wireless communication link, so that the ground electromagnetic instrument operates according to the working configuration parameters.

Optionally, the method further comprises the following step before acquiring the position coordinate parameters of the ground electromagnetic instrument:

deploying ground electromagnetic instruments, recording the position coordinate parameters of each ground electromagnetic instrument, and switching on power supply to each ground electromagnetic instrument.

Optionally, the method further comprises:

reading detection status parameters of the ground electromagnetic instrument through the second wireless communication link, and storing the detection status parameters in a storage device of the aircraft, by the aircraft; and acquiring the detection status parameters stored in the storage device of the aircraft, by the monitoring terminal, after the aircraft returns.

Optionally, the method further comprises the following step after the aircraft reads the detection status parameters of the ground electromagnetic instrument through the second wireless communication link and stores the detection status parameters in the storage device of the aircraft:

closing the second wireless communication link.

Optionally, the method further comprises the following steps after the monitoring terminal acquires the detection status parameters stored in the storage device of the aircraft after the aircraft returns:

judging whether the detection status parameters are in an abnormal state, by the monitoring terminal; and providing an appropriate prompt if the detection status parameters are in an abnormal state.

Optionally, the abnormal state is incurred by incorrect connection of a sensor or connector, and, in that case, the step of providing an appropriate prompt if the detection status parameters are in an abnormal state comprises:

prompting the user to go to the location of the ground electromagnetic instrument to handle the abnormality manually if the detection status parameters indicate incorrect connection of a sensor or connector.

Optionally, the abnormal state is incurred by incorrect parameter configuration, and, in that case, the step of providing an appropriate prompt if the detection status parameters are in an abnormal state comprises:

prompting the user to configure the parameters again, and controlling the aircraft to carry new working configuration parameters configured by the user again and fly to the location of the ground electromagnetic instrument to issue the new working configuration parameters to the ground electromagnetic instrument, if the detection status parameters indicate incorrect parameter configuration.

It is seen from the above technical scheme: the embodiments of the present invention have the following advantages:

The method and system for control and data processing in field operation with a ground electromagnetic instrument provided in the present invention utilize autonomous flight and hover functions of an aircraft, the aircraft establishes a wireless communication link with the monitoring terminal and the ground electromagnetic instruments respectively, communicates with the ground electromagnetic instruments sequentially, and can set parameters for the ground electromagnetic instruments, control start/stop of the ground electromagnetic instruments, and acquire parameters, state, and data of the ground electromagnetic instruments; the operator can interact with the aircraft via the monitoring terminal, can set the position coordinates and workflow of the ground electromagnetic instruments, issue parameters, and acquire the state and data of the instruments. Thus, the problem of manpower waste resulted from travel and on-site operation of the engineering staff. The method and system are easy and simple to use, and can improve data acquisition efficiency.

DETAILED DESCRIPTION OF THE EMBODIMENTS

To enable those skilled in the art to understand the technical scheme of the present invention better, hereunder the technical scheme in the embodiments of the present invention will be described clearly and completely with reference to the accompanying drawings. Apparently, the embodiments described below are only some embodiments of the present invention, rather than all embodiments of the present invention. Those having ordinary skilled in the art can obtain other embodiments without expending creative labor, on the basis of the embodiments provided here; however, all those embodiments shall be deemed as falling into the scope of protection of the present invention.

The terms "first", "second", "third", and "fourth", etc. (if any) in the Description, Claims, and above-mentioned accompanying drawings of the present invention are intended to differentiate similar objects, and may not be necessarily used to describe a specific order or precedence. It should be understood that the data used in such a manner is interchangeable under appropriate situations, so that the embodiment described here can be implemented in an order besides the order illustrated or described here. Moreover, the terms "comprise" and "have" and any variant of them are intended to encompass non-exclusive inclusions, such as any processes, methods, systems, products or apparatuses that include a series of steps or units, not limited to the steps or units that are clearly listed; instead, such steps or units may include other steps or units that are not listed clearly or are intrinsic to those processes, methods, products, or apparatuses.

Figure 1:
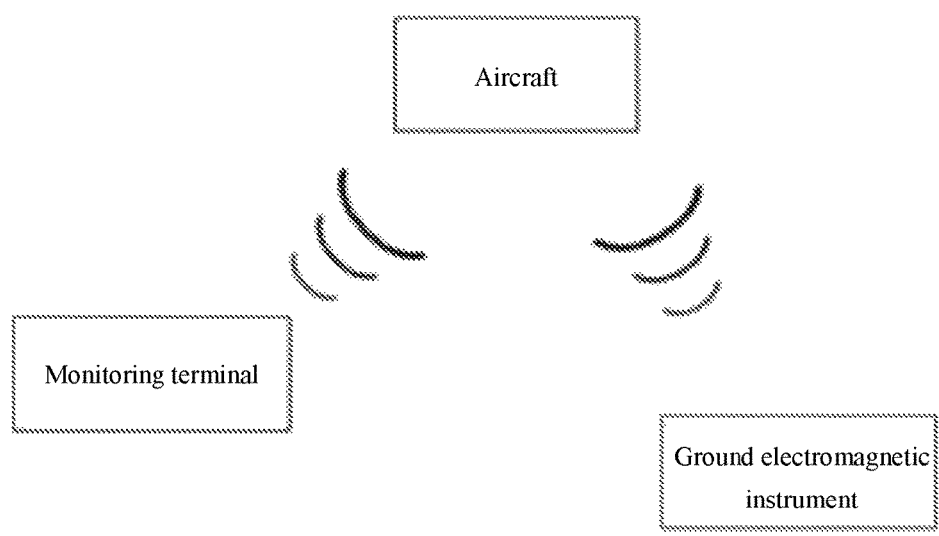
FIG. 1 is a schematic diagram of the system for control and data processing in field operation with a ground electromagnetic instrument in an embodiment of the present invention.

As shown in FIG. 1, the present invention provides a system for control and data processing in field operation with a ground electromagnetic instrument. The system comprises a ground electromagnetic instrument, an aircraft, and a monitoring terminal, wherein, the ground electromagnetic instrument comprises a first wireless communication module and a first processing module; the aircraft comprises a second wireless communication module configured to establish wireless communication with the first wireless communication module, a storage device, a satellite positioning and inertial navigation module, and a second processing module; the monitoring terminal comprises a third wireless communication module configured to establish wireless communication with the second wireless communication module, and a third processing module configured to transmit position coordinate parameters and working configuration parameters of the ground electromagnetic instrument to the second processing module by means of wireless communication; the second processing module stores the position coordinate parameters in the storage device, and controls the aircraft to fly to the location of the ground electromagnetic instrument according to the positioning data from the satellite positioning and inertial navigation module and the position coordinate parameters, the second wireless communication module establishes a first wireless communication link with the first wireless communication module, and the second processing module configures the working configuration parameters to the first processing module through the first wireless communication link, so that the ground electromagnetic instrument accomplishes acquisition of required data according to the working configuration parameters.

This embodiment is described exemplarily with one ground electromagnetic instrument. In a case that a plurality of ground electromagnetic instruments are provided, the working configuration parameters may be issued to the plurality of ground electromagnetic instruments one by one in the same way.

In the preparation stage, the operator deploys ground electromagnetic instruments and switches on the power supply to each ground electromagnetic instrument. The operator sets the position coordinate parameters and working configuration parameters for each ground electromagnetic instrument on the monitoring terminal; the aircraft is powered on and operates, and carries out initialization of navigational parameters, including navigation satellite signal acquisition and initial inertial navigation alignment; the operator transmits the position coordinate parameters and working configuration parameters of each ground electromagnetic instrument to the aircraft via the monitoring terminal; the aircraft flies autonomously to each of the ground electromagnetic instruments sequentially according to the position coordinate parameters, hovers above each ground electromagnetic instrument, establishes wireless communication with the ground electromagnetic instrument, issues the parameters to the corresponding ground electromagnetic instrument, and controls the ground electromagnetic instrument to start operation.

Optionally, the aircraft is further configured to fly to the location of the ground electromagnetic instrument according to the position coordinate parameters, establish a second wireless communication link, acquire detection status parameters of the ground electromagnetic instrument, and store the detection status parameters in the storage device, then close the second wireless communication link, in the patrol-check and monitoring process; and the monitoring terminal is configured to establish the first wireless communication link with the aircraft and read the detection status parameters stored in the storage device of the aircraft during the data reading process.

In the patrol-check stage, after the instrument starts operation, the operator sets on the monitoring terminal to enter into the patrol-check stage, and sets the position coordinate parameters of the ground electromagnetic instruments to be patrol-checked; the monitoring terminal establishes wireless communication with the aircraft, and transmits the parameters to the aircraft; the aircraft flies autonomously to a ground electromagnetic instrument, hovers above the ground electromagnetic instrument, and establishes a wireless communication link with the ground electromagnetic instrument; the aircraft acquires information such as the operating state of the ground electromagnetic instrument, acquired data, and quality parameters, etc., and stores the information in the storage device in it, and then closes the wireless communication link; next, the aircraft flies to the next ground electromagnetic instrument and performs operations as described above, and so on, till all specified ground electromagnetic instruments are checked; then, the aircraft flies back to the location of the operator, establishes a wireless communication link with the monitoring terminal, and returns the acquired detection status parameters of the ground electromagnetic instruments, including operating state, acquired data, and quality parameters, to the monitoring terminal; the operator evaluates the operating state of each ground electromagnetic instrument via the monitoring terminal, and exercises intervention if any abnormality is found; if the operator judges that there is any incorrect connection of sensor or connector, he/she may go to the site and handle the problem manually; if the operator judges that the parameter configuration is incorrect, e.g., the magnification factor of the circuit is improper, he/she may configure the parameters again and then control the aircraft to go to the site to issue the parameters; the patrol-check task is executed periodically in the entire operation process.

After the instrument patrol-check task is accomplished, the system enters into a data acquisition stage. In the data acquisition stage, the operator sets on the monitoring terminal to enter into the data acquisition stage, and configures the position coordinate parameters of the ground electromagnetic instruments; the monitoring terminal establishes wireless communication with the aircraft, and transmits the parameters to the aircraft; the aircraft flies autonomously to a ground electromagnetic instrument, hovers above the ground electromagnetic instrument, and establishes a wireless communication link with the ground electromagnetic instrument; the aircraft acquires the detection status parameters of the ground electromagnetic instrument, stores the detection status parameters in its storage device, and closes the wireless communication link; next, the aircraft flies to the next ground electromagnetic instrument and performs operations as described above, and so on, till the detection status parameters of all specified ground electromagnetic instruments are acquired; then, the aircraft flies back to the location of the operator, establishes a wireless communication link with the monitoring terminal, and returns the acquired data to the monitoring terminal.

The monitoring terminal is further configured to judge whether the ground electromagnetic instrument is in an abnormal state according to the detection status parameters read by the monitoring terminal.

If the abnormal state is incurred by incorrect connection of a sensor or connector, the monitoring terminal is further configured to prompt the user to go to the location of the ground electromagnetic instrument to handle the abnormality manually.

If the abnormal state is incurred by incorrect parameter configuration, the monitoring terminal is further configured to prompt the user to configure the parameters again, and control the aircraft to carry new working configuration parameters configured by the user again and fly to the location of the ground electromagnetic instrument to issue the new working configuration parameters to the ground electromagnetic instrument.

The monitoring terminal further comprises a display device configured to display a control interface, wherein, the display device is electrically connected to the first processing module, reads the state parameter of the instruments and the data acquired by the aircraft, and can present the parameters and data to the operator intuitively, so that the operator can view the parameters and data conveniently and timely.

The system for control and data processing in field operation with a ground electromagnetic instrument provided in the embodiment of the present invention utilizes autonomous flight and hover functions of an aircraft, the aircraft establishes a wireless communication link with the monitoring terminal and the ground electromagnetic instruments respectively, communicates with the ground electromagnetic instruments sequentially, and can set parameters for the ground electromagnetic instruments, control start/stop of the ground electromagnetic instruments, and acquire parameters, state, and data of the ground electromagnetic instruments; the operator can interact with the aircraft via the monitoring terminal, can set the position coordinates and workflow of the ground electromagnetic instruments, issue parameters, and acquire the state and data of the instruments. Thus, the problem of manpower waste resulted from travel and on-site operation of the engineering staff. The method and system are easy and simple to use, and can improve data acquisition efficiency.

Figure 2:
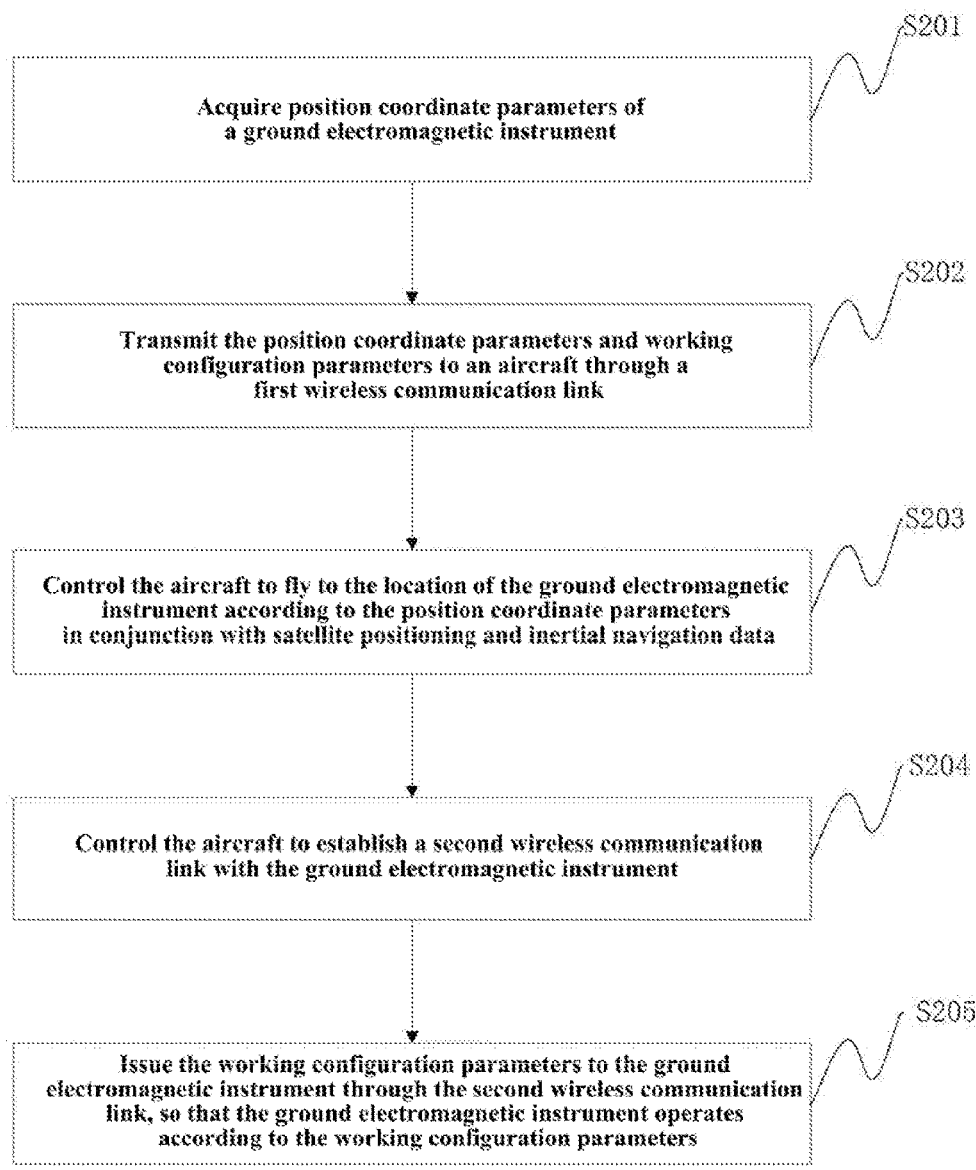
FIG. 2 is a flow diagram of the method for control and data processing in field operation with a ground electromagnetic instrument in an embodiment of the present invention.

As shown in FIG. 2, the present invention provides a method for control and data processing in field operation with a ground electromagnetic instrument. The method comprises:

S201. acquiring position coordinate parameters of a ground electromagnetic instrument;

S202. transmitting the position coordinate parameters and working configuration parameters to an aircraft through a first wireless communication link;

S203. controlling the aircraft to fly to the location of the ground electromagnetic instrument according to the position coordinate parameters in conjunction with satellite positioning and inertial navigation data;

S204. controlling the aircraft to establish a second wireless communication link with the ground electromagnetic instrument; and S205. issuing the working configuration parameters to the ground electromagnetic instrument through the second wireless communication link, so that the ground electromagnetic instrument operates according to the working configuration parameters.

Optionally, the method further comprises the following step before acquiring the position coordinate parameters of the ground electromagnetic instrument:

deploying ground electromagnetic instruments, recording the position coordinate parameters of each ground electromagnetic instrument, and switching on power supply to each ground electromagnetic instrument.

Optionally, the method further comprises:

reading detection status parameters of the ground electromagnetic instrument through the second wireless communication link, and storing the detection status parameters in a storage device of the aircraft, by the aircraft; and acquiring the detection status parameters stored in the storage device of the aircraft, by the monitoring terminal, after the aircraft returns.

Optionally, the method further comprises the following step after the aircraft reads the detection status parameters of the ground electromagnetic instrument through the second wireless communication link and stores the detection status parameters in the storage device of the aircraft:

closing the second wireless communication link.

Optionally, the method further comprises the following steps after the monitoring terminal acquires the detection status parameters stored in the storage device of the aircraft after the aircraft returns:

judging whether the detection status parameters are in an abnormal state, by the monitoring terminal; and providing an appropriate prompt if the detection status parameters are in an abnormal state.

Optionally, the abnormal state is incurred by incorrect connection of a sensor or connector, and, in that case, the step of providing an appropriate prompt if the detection status parameters are in an abnormal state comprises:

prompting the user to go to the location of the ground electromagnetic instrument to handle the abnormality manually if the detection status parameters indicate incorrect connection of a sensor or connector.

Optionally, the abnormal state is incurred by incorrect parameter configuration, and, in that case, the step of providing an appropriate prompt if the detection status parameters are in an abnormal state comprises:

prompting the user to configure the parameters again, and controlling the aircraft to carry new working configuration parameters configured by the user again and fly to the location of the ground electromagnetic instrument to issue the new working configuration parameters to the ground electromagnetic instrument, if the detection status parameters indicate incorrect parameter configuration.

In the preparation stage, the operator deploys ground electromagnetic instruments and switches on the power supply to each ground electromagnetic instrument. The operator sets the position coordinate parameters and working configuration parameters for each ground electromagnetic instrument on the monitoring terminal; the aircraft is powered on and operates, and carries out initialization of navigational parameters, including navigation satellite signal acquisition and initial inertial navigation alignment; the operator transmits the position coordinate parameters and working configuration parameters of each ground electromagnetic instrument to the aircraft via the monitoring terminal; the aircraft flies autonomously to each of the ground electromagnetic instruments sequentially according to the position coordinate parameters, hovers above each ground electromagnetic instrument, establishes wireless communication with the ground electromagnetic instrument, issues the parameters to the corresponding ground electromagnetic instrument, and controls the ground electromagnetic instrument to start operation.

In the patrol-check stage, after the instrument starts operation, the operator sets on the monitoring terminal to enter into the patrol-check stage, and sets the position coordinate parameters of the ground electromagnetic instruments to be patrol-checked; the monitoring terminal establishes wireless communication with the aircraft, and transmits the parameters to the aircraft; the aircraft flies autonomously to a ground electromagnetic instrument, hovers above the ground electromagnetic instrument, and establishes a wireless communication link with the ground electromagnetic instrument; the aircraft acquires information such as the operating state of the ground electromagnetic instrument, acquired data, and quality parameters, etc., and stores the information in the storage device in it, and then closes the wireless communication link; next, the aircraft flies to the next ground electromagnetic instrument and performs operations as described above, and so on, till all specified ground electromagnetic instruments are checked; then, the aircraft flies back to the location of the operator, establishes a wireless communication link with the monitoring terminal, and returns the acquired detection status parameters of the ground electromagnetic instruments, including operating state, acquired data, and quality parameters, to the monitoring terminal; the operator evaluates the operating state of each ground electromagnetic instrument via the monitoring terminal, and exercises intervention if any abnormality is found; if the operator judges that there is any incorrect connection of sensor or connector, he/she may go to the site and handle the problem manually; if the operator judges that the parameter configuration is incorrect, e.g., the magnification factor of the circuit is improper, he/she may configure the parameters again and then control the aircraft to go to the site to issue the parameters; the patrol-check task is executed periodically in the entire operation process.

After the instrument patrol-check task is accomplished, the system enters into a data acquisition stage. In the data acquisition stage, the operator sets on the monitoring terminal to enter into the data acquisition stage, and configures the position coordinate parameters of the ground electromagnetic instruments; the monitoring terminal establishes wireless communication with the aircraft, and transmits the parameters to the aircraft; the aircraft flies autonomously to a ground electromagnetic instrument, hovers above the ground electromagnetic instrument, and establishes a wireless communication link with the ground electromagnetic instrument; the aircraft acquires the detection status parameters of the ground electromagnetic instrument, stores the detection status parameters in its storage device, and closes the wireless communication link; next, the aircraft flies to the next ground electromagnetic instrument and performs operations as described above, and so on, till the detection status parameters of all specified ground electromagnetic instruments are acquired; then, the aircraft flies back to the location of the operator, establishes a wireless communication link with the monitoring terminal, and returns the acquired data to the monitoring terminal.

The method for control and data processing in field operation with a ground electromagnetic instrument provided in the embodiment of the present invention utilizes autonomous flight and hover functions of an aircraft, the aircraft establishes a wireless communication link with the monitoring terminal and the ground electromagnetic instruments respectively, communicates with the ground electromagnetic instruments sequentially, and can set parameters for the ground electromagnetic instruments, control start/stop of the ground electromagnetic instruments, and acquire parameters, state, and data of the ground electromagnetic instruments; the operator can interact with the aircraft via the monitoring terminal, can set the position coordinates and workflow of the ground electromagnetic instruments, issue parameters, and acquire the state and data of the instruments. Thus, the problem of manpower waste resulted from travel and on-site operation of the engineering staff. The method and system are easy and simple to use, and can improve data acquisition efficiency.

Those skilled in the art can clearly understand: for the convenience and concision of description, the specific operating processes of the system, apparatus and units described above may be understood with reference to the corresponding process in the embodiments of the method described above, and are not iterated here.

It should be understood that the system, apparatus and method disclosed in the embodiments provided in the present application may be implemented in other ways. For example, the embodiment of the apparatus described above is only exemplary. For example, the division of the units is only a logic function division, and may be implemented in other ways in the actual implementation. For example, a plurality of units or components may be combined or integrated into another system, or some features may be neglected or not implemented. Besides, the illustrated or discussed coupling or direct coupling or communication connection between the devices or units may be implemented via some interfaces, and the indirect coupling or communication connection between the devices or units may be electrical, mechanical, or in other forms.

The units that are described as separate components may be or not be separated physically, and the components illustrated as units may be or not be physical units, i.e., they may be located at one place or distribute to a plurality of network elements. A part of or all of the units may be selected according to the actual requirement to attain the object of the scheme in the embodiments.

In addition, the functional units in the embodiments of the present invention may be integrated in one processing unit or exist as physically separate units, and two or more units may be integrated in one unit. The above-mentioned integrated units may be implemented in the form of hardware or software functional units.

Those having ordinary skills in the art should understand that all or a part of the steps of the methods in the above-mentioned embodiments may be accomplished by instructing relevant hardware with a program that may be stored in a computer-readable storage medium, which may include: Read Only Memory (ROM), Random Access Memory (RAM), magnetic disk, or optical disk, etc.

While the method and system for control and data processing in field operation with a ground electromagnetic instrument provided in the present invention are described above in detail, those having ordinary skills in the art may make modifications to the specific embodiments and application scopes on the basis of the idea in the embodiments of the present invention. In summary, the content of the specification shall not be interpreted as constituting any limitation to the present invention.

The invention claimed is:

1. A system for control and data processing in field operation with a ground electromagnetic instrument, comprising:
a ground electromagnetic instrument, an autonomous aircraft, and a monitoring terminal,
wherein the ground electromagnetic instrument comprises a first wireless communication module and a first processing module;
wherein the autonomous aircraft comprises a second wireless communication module configured to establish wireless communication with the first wireless communication module, a storage device, a satellite positioning and inertial navigation module, and a second processing module;
wherein the monitoring terminal comprises a third wireless communication module configured to establish wireless communication with the second wireless communication module, and a third processing module configured to transmit position coordinate parameters and working configuration parameters of the ground electromagnetic instrument to the second processing module by means of wireless communication;
wherein the second processing module stores the position coordinate parameters in the storage device, and controls the autonomous aircraft to fly to a location of the ground electromagnetic instrument according to a positioning data from the satellite positioning and inertial navigation module and the position coordinate parameters,
wherein the second wireless communication module establishes a first wireless communication link with the first wireless communication module, and the second processing module configures the working configuration parameters to the first processing module through the first wireless communication link, so that the ground electromagnetic instrument acquires data according to the working configuration parameters,
wherein the ground electromagnetic instrument is a magnetotellurics (MT) instrument.

2. The system according to claim 1, wherein, in a patrol-check and monitoring mode, the autonomous aircraft is further configured to fly to the location of the ground electromagnetic instrument according to the position coordinate parameters, to establish the second wireless communication link, to acquire detection status parameters of the ground electromagnetic instrument, and to store the detection status parameters in the storage device, then to close the second wireless communication link, and
wherein, in a data reading mode, the monitoring terminal is configured to establish the first wireless communication link with the autonomous aircraft and read the detection status parameters stored in the storage device of the autonomous aircraft.

3. The system according to claim 2, wherein the monitoring terminal is further configured to determine whether the ground electromagnetic instrument is in an abnormal state according to the detection status parameters read by the monitoring terminal.

4. The system according to claim 3, wherein, when the abnormal state is incurred by incorrect connection of a sensor or connector, the monitoring terminal is further configured to prompt a user to go to the location of the ground electromagnetic instrument to handle the abnormality manually.

5. The system according to claim 3, wherein, when the abnormal state is incurred by incorrect parameter configuration, the monitoring terminal is further configured to prompt a user to configure the position coordinate parameters and working configuration parameters again, and to control the aircraft to carry new working configuration parameters configured by the user again and fly to the location of the ground electromagnetic instrument to issue the new working configuration parameters to the ground electromagnetic instrument.

6. A method for control and data processing in field operation with a ground electromagnetic instrument, comprising:
acquiring position coordinate parameters of a ground electromagnetic instrument, wherein the ground electromagnetic instrument is a magnetotellurics instrument;
transmitting the position coordinate parameters and working configuration parameters to an autonomous aircraft through a first wireless communication link;
controlling the aircraft to fly to a location of the ground electromagnetic instrument according to the position coordinate parameters in conjunction with satellite positioning and inertial navigation data;
controlling the autonomous aircraft to establish a second wireless communication link with the ground electromagnetic instrument; and
issuing the working configuration parameters to the ground electromagnetic instrument through the second wireless communication link, so that the ground electromagnetic instrument operates according to the working configuration parameters.

7. The method according to claim 6, further comprising;
deploying a plurality of ground electromagnetic instruments, recording the position coordinate parameters of each ground electromagnetic instrument, and switching on power supply to each ground electromagnetic instrument.

8. The method according to claim 6, further comprising:
reading detection status parameters of the ground electromagnetic instrument through the second wireless communication link, and storing the detection status parameters in a storage device of the autonomous aircraft; and
acquiring the detection status parameters stored in the storage device of the autonomous aircraft.

9. The method according to claim 6, further comprising:
determining whether the detection status parameters are in an abnormal state; and providing an appropriate prompt if the detection status parameters are in an abnormal state.

10. The method according to claim 6, further comprising, when the abnormal state is incurred by incorrect parameter configuration, prompting a user to configure the parameters and controlling the autonomous aircraft to carry new working configuration parameters configured by the user and fly to the location of the ground electromagnetic instrument to issue the new working configuration parameters to the ground electromagnetic instrument.

* * * * *